(12) United States Patent
Cai et al.

(10) Patent No.: US 8,811,170 B2
(45) Date of Patent: Aug. 19, 2014

(54) COMMON QUALITY OF SERVICE ENFORCEMENT FOR A GROUP OF MOBILE ENTITIES

(75) Inventors: Xuejun Cai, Beijing (CN); Yuxi Shen, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 132 days.

(21) Appl. No.: 13/696,493

(22) PCT Filed: May 7, 2010

(86) PCT No.: PCT/CN2010/000640
§ 371 (c)(1),
(2), (4) Date: Nov. 15, 2012

(87) PCT Pub. No.: WO2011/137564
PCT Pub. Date: Nov. 10, 2011

(65) Prior Publication Data
US 2013/0051231 A1    Feb. 28, 2013

(51) Int. Cl.
| | | |
|---|---|---|
| *H04W 76/02* | (2009.01) | |
| *H04W 4/08* | (2009.01) | |
| *H04W 4/00* | (2009.01) | |
| *H04L 29/08* | (2006.01) | |
| *H04W 28/22* | (2009.01) | |
| *H04W 60/00* | (2009.01) | |
| *H04W 8/18* | (2009.01) | |

(52) U.S. Cl.
CPC ............... *H04L 67/306* (2013.01); *H04W 4/08* (2013.01); *H04W 60/00* (2013.01); *H04W 4/005* (2013.01); *H04W 76/02* (2013.01); *H04W 28/22* (2013.01); *H04W 8/186* (2013.01)
USPC ........................................ 370/230; 455/435.1

(58) Field of Classification Search
USPC ........................ 370/229, 230, 328, 329, 348; 455/426.1, 435.1, 435.2
See application file for complete search history.

(56) References Cited

U.S. PATENT DOCUMENTS

| | | | |
|---|---|---|---|
| 7,808,970 B2 | 10/2010 | Narayanan et al. | |
| 2009/0047952 A1* | 2/2009 | Giaretta et al. | ............ 455/435.1 |
| 2011/0022686 A1 | 1/2011 | Ding | |
| 2011/0170506 A1* | 7/2011 | Zisimopoulous et al. | .... 370/329 |
| 2012/0184266 A1* | 7/2012 | Faccin et al. | ............... 455/426.1 |
| 2014/0050168 A1* | 2/2014 | Zisimopoulous et al. | .... 370/329 |

FOREIGN PATENT DOCUMENTS

| | | |
|---|---|---|
| CN | 101448243 A | 6/2009 |
| CN | 101584230 A | 11/2009 |
| CN | 101686191 A | 3/2010 |
| WO | 2010037309 A1 | 4/2010 |

OTHER PUBLICATIONS

International Search Report (mailed Feb. 10, 2011) in re: International Application No. PCT/CN2010/000640.

* cited by examiner

*Primary Examiner* — Kerri Rose
(74) *Attorney, Agent, or Firm* — Coats & Bennett, PLLC

(57) ABSTRACT

The invention relates to a method for controlling the maximum bit rate for a bearer used for data transmission over a packet-switched network using a specified access point for a group of mobile entities. A PDN gateway enforces the maximum bit rate for the group, the APN group AMBR. This is possible as all mobile entities belonging to said group are connected to the same PDN gateway for a certain access point name APN. This is obtained by providing a PDN gateway information into an update location acknowledgement message sent from the HSS to the MME.

21 Claims, 5 Drawing Sheets

COMMON QUALITY OF SERVICE ENFORCEMENT FOR A GROUP OF MOBILE ENTITIES

TECHNICAL FIELD

The present invention relates to a method for controlling an attach procedure of a mobile entity to a packet-switched network, the mobile entity belonging to a group of mobile entities that are accessing the packet-switched network using a specified access point. The invention furthermore relates to a method for operating a subscriber database in which subscriber-related profiles of the mobile entities are provided, and to a method for operating a PDN gateway, through which the mobile entity belonging to said group accesses said packet-switched network. The invention relates additionally to a subscriber database containing subscriber-related profiles and a PDN gateway through which the mobile entity belonging to said group accesses said packet-switched network.

BACKGROUND

In machine-to-machine applications, some machine-type communication (MTC) clients could belong to the same MTC user or server as known from 3GPP TS 22.368 "Service Requirements for Machine-Type Communications". One requirement from the operator and the network is that some common quality of service (QoS) parameters could be applied onto users that belong to the same group. By way of example all users of the same group should not exceed a maximum bit rate. This mechanism is not only used for machine-to-machine services, but can also be used for normal services. By way of example for a company which has multiple subscribers, the common quality of service parameter is also meaningful. In an evolved packet system (EPS) the bearer is the central element of a quality of service concept (see also 3GPP TS 23.401, "General Packet Radio Service (GPRS) Enhancements for Evolved Universal Terrestrial Radio Access Network (E-UTRAN Access)"). An EPS bearer uniquely identifies packet flows that receive a common quality of service treatment between the terminal and the gateway. Two types of bearers are defined in EPS: guaranteed bit rate (GBR) bearers and non-guaranteed bit rate (non-GBR) bearers. On a GBR bearer a certain bandwidth is reserved and remains available as long as the bearer exists. The maximum bit rates MBR and GBR are defined only for GBR bearers. These parameters define the MBR that is the bit rate that the traffic on the bearer may not exceed and the GBR corresponding to the bit rate that the network guarantees. It can sustain for that bearer, e.g. through the use of an admission control function. For non-GBR bearers an aggregated maximum bit rate (AMBR) is defined to limit the total amount of bit rate consumed by a single subscriber. It is not defined per bearer, but rather per group of non-GBR bearers. Two AMBR parameters are defined in 3GPP, APN AMBR and UE AMBR. Both of the AMBRs are defined for an aggregation of non-GBR bearers.

As described above, in the 3GPP environment, the quality of service control is designed per bearer or per subscriber, but not designed for a group containing multiple mobile entities or member devices. The quality of service parameters defined in 3GPP includes QCI (quality of service class identifier), ARP (allocation and retention priority), MBR (maximum bit rate), and APN-AMBR (aggregated maximum bit rate per access point name). All these parameters are defined within a mobile entity's scope. It is not possible to control the quality of service for a group containing multiple members.

Accordingly, a need exists to provide a possibility to enforce a common quality of service parameter, such as the maximum bit rate for the data sent/received by a group of mobile entities.

SUMMARY

This need is met by the features of the independent claims. In the dependent claims preferred embodiments of the invention are described.

According to a first aspect of the invention a method for controlling an attach procedure of a mobile entity to a packet-switched network is provided, the mobile entity belonging to a group of mobile entities which are accessing the packet-switched network using a specified access point. The method comprises the step of receiving an attach request message for one of the mobile entities. Additionally, an update location request message is transmitted to a subscriber database, where subscriber-related profiles of said group of mobile entities are provided. Furthermore, a response message from the subscriber database is received, the response message including PDN gateway information indicative of a PDN gateway associated with or to be associated with said group of mobile entities. The response message further includes a maximum bit rate information for a bearer used for data transmission over said packet-switched network using said specified access point. Furthermore, a PDN gateway is selected based on the PDN gateway information contained in the response message and a bearer setup of a bearer meeting said maximum bit rate information contained in the response message is initiated.

The above method, which may e.g. be carried out by a mobile management entity (MME), allows to ensure that all mobile entities of the same group are connected to the same PDN gateway for said specified access point. This helps the PDN gateway to enforce the maximum bit rate for all mobile entities of said group, as all members of the group access the packet-switched network via said PDN gateway that was selected trough the PDN gateway information included in the response message from the subscriber database. If the mobile entities of a group were connected to multiple different PDN gateways, the multiple gateways would have to cooperate to enforce the limitation to a maximum bandwidth. However, this would require a frequent information exchange and complex synchronization between the different gateways. This drawback is avoided by ensuring that all mobile entities of a group of mobile entities use the same PDN gateway to access the packet-switched network.

According to an embodiment of the invention, the step of initiating a bearer setup comprises the step of selecting a serving gateway and transmitting a create session request message to said serving gateway for said PDN gateway including said PDN gateway information and said maximum bit rate information. Furthermore, it is possible that a group identity information allowing to identify the group to which said mobile entity belongs is included in the response message received from the subscriber database. However, the group identity information needs not necessarily be included in the received response message from the subscriber database. The MME may also know this information. The group information may furthermore be passed on to the PDN gateway.

In the above-discussed step of the selection of a PDN gateway the selection of the PDN gateway may also be based on the specified access point, e.g. based on the access point name APN identifying an IP packet data network the mobile entity communicates with.

Further, a notify request message may be transmitted to the subscriber database including said PDN gateway information, said maximum bit rate information and said group identity information if needed, after a modify bearer response message has been received from a serving gateway.

As discussed above, the method comprises the step of selecting the PDN gateway provided on the PDN gateway information. Particularly when the mobile entity is the first member of the group that is attaching to the packet-switched network, the PDN gateway information received may be such that no prescribed PDN gateway has to be selected by the MME, e.g. by not containing PDN gateway information, allowing a free selection of a new PDN gateway by the MME. In this context the selection of a new PDN gateway is for example possible if said mobile entity is the first member of the group that is attaching to the packet-switched network and the PDN gateway information included in the response message comprises the information allowing the MME to freely select the PDN gateway, i.e. the response message does not comprise an information allowing to identify a PDN gateway associated with or to be associated with said group of mobile entities. If the information is included that a free selection of the PDN gateway is possible, a PDN gateway may be selected as known from existing 3GPP standards.

Furthermore, when the PDN gateway has been freely selected by the MME, the selected PDN gateway information is preferably sent to the subscriber database after the selection where the PDN gateway information is stored allowing the selection of the same PDN gateway when the next member of the group is accessing the packet-switched network. This helps to assure that all the other mobile entities of said group can connect to the same PDN gateway.

The invention furthermore relates to a method for operating a subscriber database in which subscriber-related profiles of the mobile entities subscribing to a cellular network are provided. The database includes a subscriber group related profile of a group of mobile entities which are accessing the packet-switched network using a specified access point. The method comprises the step of receiving, for one of the mobile entities of said group, an update location request message relating to an access for said one mobile entity to the packet-switched network. The subscriber database checks whether said one mobile entity is part of said group of mobile entities and if it is determined that said one mobile entity is part of said group, a PDN gateway information indicative of a PDN gateway associated with or to be associated with said group of mobile entities is retrieved together with a maximum bit rate information for a bearer used for the data transmission over said packet-switched network. The PDN gateway information and the maximum bit rate information are retrieved from the subscriber group related profile and are included into an update acknowledgement message. This message can be sent to the MME. This message can preferably, but not necessarily, include the group identity information allowing to identify the group to which said mobile entity belongs to.

The subscriber database containing the subscriber group related profile can make sure that always the same PDN gateway is selected by the members of the group by including the PDN gateway information in the update acknowledgement message sent to the MME.

If said one mobile entity is the first member of the group that is attaching to the packet-switched network, a PDN gateway information predetermined by the subscriber database may be included into the update acknowledgement message or an information allowing the entity receiving the update acknowledgement message (e.g. the MME) to freely select a new PDN gateway. In this context if said information allowing the entity receiving the update acknowledgement message to select a new PDN gateway was contained in the update acknowledgement message, a selected PDN gateway information may be received after the selection of the PDN gateway and stored in the subscriber database helping to keep the PDN gateway information contained in the subscriber database up to date. As discussed above, this helps to assure that all mobile entities of said group that are attaching later will be connected to the same PDN gateway.

The method for operating the subscriber database may furthermore comprise the step of determining in a detach procedure of one of the mobile entities belonging to said group, the number of mobile entities of said group that is still attached to said packet-switched network. If it is determined that the last member of the group has detached, the PDN gateway information in the subscriber database is set to the predetermined information or to the information allowing the receiving identity to select the PDN gateway. Thus, if one of the mobile entities of said group is attached to the network, all the other members of the group will access the network through the same PDN gateway and if no member of the group is attached and a first member is attaching, either the MME can freely select the PDN gateway or the subscriber database selects a predetermined PDN gateway and transmits this information to the MME.

According to another aspect of the invention, a method for operating a PDN gateway is provided through which a mobile entity belonging to said group of mobile entities which are accessing the packet-switched network using the specified access point accesses said packet-switched network. The method comprises the step of determining, in a received create session request message of the mobile entity, for which said create session request message was received, a group identity information allowing to identify the group to which said mobile entity belongs to. Furthermore, a group profile is created containing group configuration information including said group identity information, an access point information allowing to identify the access point used to access the packet-switched network and a maximum bit rate information for a bearer used for data transmission over said packet-switched network for said group using said specified access point. The method furthermore comprises the step of transmitting a create session response message including said group identity information to a control node controlling an attach procedure of said mobile entity to the packet-switched network. Said control node may e.g. be an MME. The access point information can be the access point name APN identifying the access point to the packet-switched network. It is possible to further include in the create session response message the access point information and/or the maximum bit rate information. However, the access point information and the maximum bit rate information may not necessarily be included, as the MME may know this information anyway or does not necessarily need it.

According to an embodiment, if the create session request message containing group identification information is received, the group identity information is retrieved from the subscriber group related profile and a bearer context of said mobile entity is added to the subscriber group related profile. For each attached group the PDN gateway creates an entry to contain the group identification information.

The method of operating the PDN gateway may comprise enforcing an aggregated maximum bit rate for all non-guaranteed bit rate bearers used by the group of mobile entities accessing the packet-switched network using said specified access point, the enforcement being based on the maximum bit rate information for a bearer used for data transmission over said packet-switched network for said group using said access point. Preferably, the maximum bit rate information is the aggregated maximum bit rate information AMBR for the group of mobile entities for the specified access point.

The present invention as described herein may be applied to machine-type communication (MTC) entities or to normal mobile entities used by human beings.

The invention furthermore relates to the subscriber database containing subscriber-related profiles of subscribers of a cellular network, the database furthermore comprising at least one subscriber group related profile of a group of mobile entities, wherein said at least one subscriber group related profile contains group-related subscriber information including at least PDN gateway information indicative of a PDN gateway associated with or to be associated with said group of mobile entities. Said at least one subscriber group related profile furthermore contains group-related subscriber information including a maximum bit rate information for at least one bearer used for data transmission over said packet-switched network—for said group and a group identity information allowing to identify the group to which said mobile entity belongs.

The subscriber group related profile helps to make sure that the different mobile entities relating to said group access the packet-switched network through a single PDN gateway.

Said at least one subscriber group related profile may further contain at least one of the following information: A group name used to denote the group of mobile entities, which may be a string to denote the name of the group. Additionally, an APN name may be provided in the group related profile denoting the name of the access point associated with said group. Furthermore, the profile may contain the number of connected members of the group connected to the packet-switched network.

Furthermore, the subscriber database may be such that each mobile entity has its own subscriber profile, the subscriber group related profile being obtained by providing, for each subscriber profile of the mobile entities belonging to the group of mobile entities, information indicating the group of mobile entities.

As discussed above, the mobile entity may be a machine-type communication MTC entity or a normal mobile entity provided for a user.

According to another aspect of the invention, a PDN gateway is provided through which the mobile entity belonging to a group of mobile entities accesses said packet-switched network, the PDN gateway comprising a receiver for receiving a create session request message of said mobile entity. Furthermore, storage means are provided for storing one or more group-related profiles containing group configuration information including group identity information of said group of mobile entities, access point information allowing to identify the access point used to access the packet-switched network, and a maximum bit rate information for the bearer used for the data transmission over said packet-switched network for said group using said specified access point. Furthermore, a transmitter is provided transmitting a create session response message including at least said group identity information to the control node controlling the attach procedure of the mobile entity to the packet-switched network.

In said storage means further information may be contained, for example a group name used to denote the group of mobile entities, an APN name denoting the name of the access point associated with said group, and/or a number of connected members of the group connected to the packet switched network In all above aspects and embodiments of the invention, the maximum bit rate information may be an aggregated maximum bit rate for said group of mobile entities per access point, APN group AMBR, for all non-guaranteed bit rate bearers across all connections of the mobile entities belonging to said group for the same access point.

BRIEF DESCRIPTION OF THE DRAWINGS

The invention will be described in further detail below with reference to the accompanying drawings, in which.

DETAILED DESCRIPTION

Figure 1:
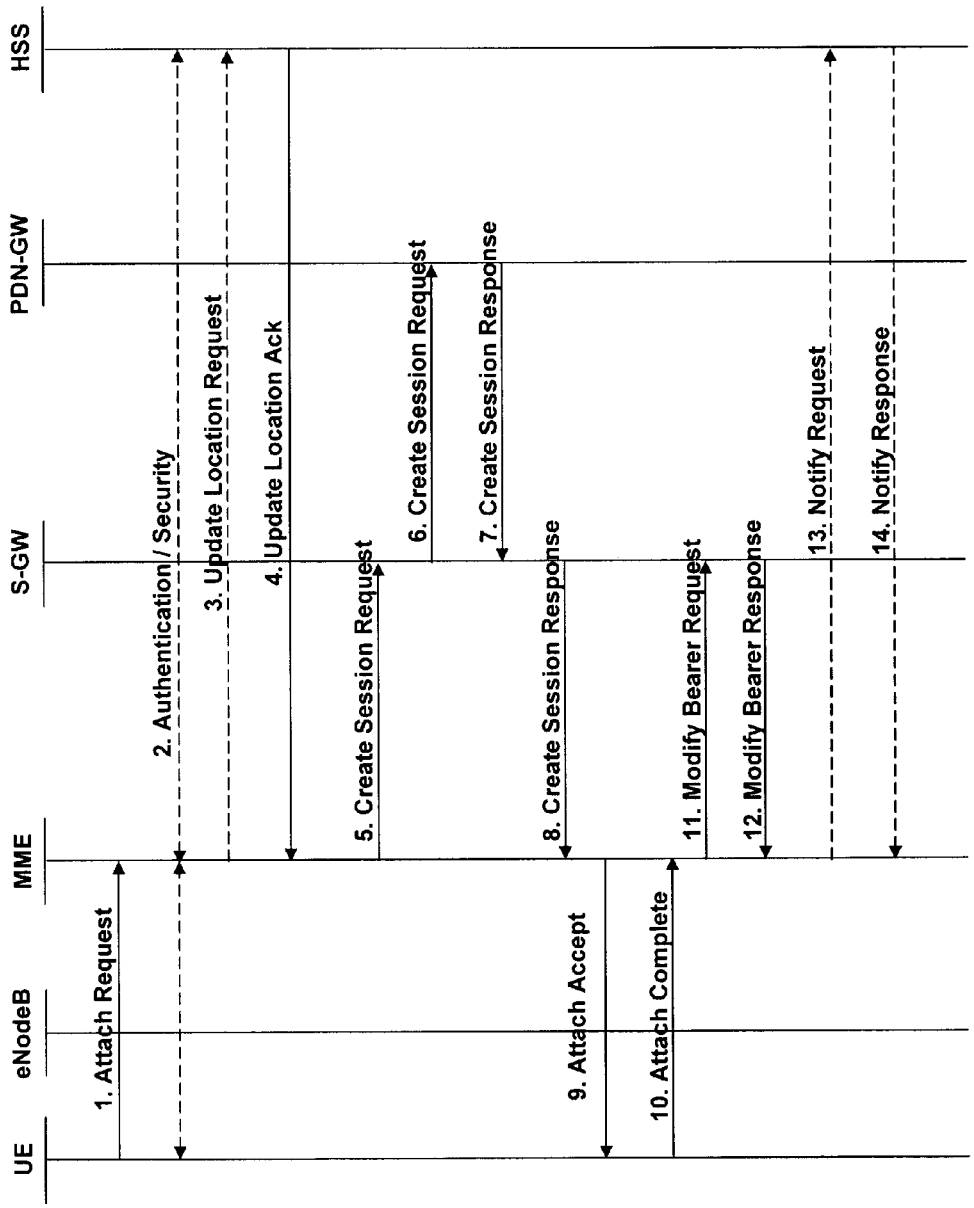
FIG. 1 shows a state diagram of an attach procedure of a mobile entity belonging to a group of mobile entities to the packet-switched network.
Figure 2:
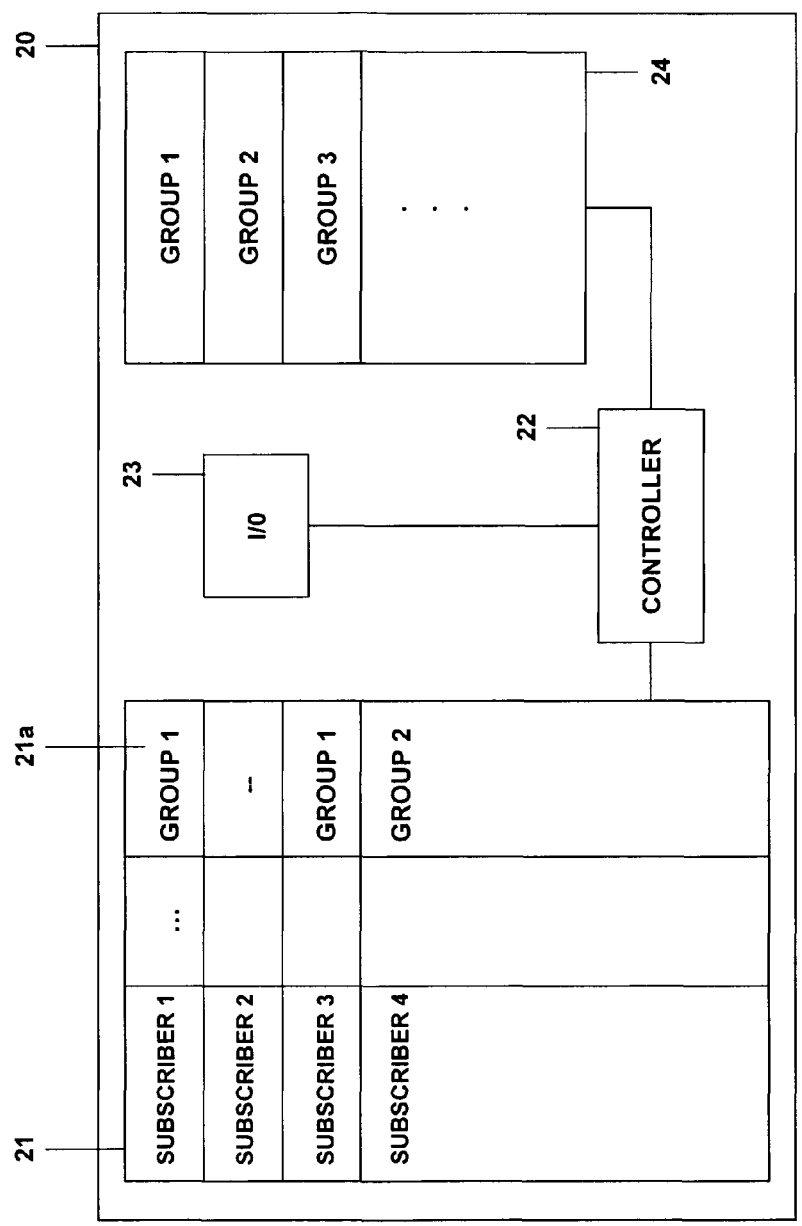
FIG. 2 is a schematic view of a subscriber database containing subscriber group related profiles.

With reference to FIGS. 1 and 2 a method is disclosed making sure that all mobile devices of a group of mobile devices are connected to the same PDN gateway for a certain APN for accessing the packet-switched network. The mobile entity may be a MTC device or a mobile entity used by subscribers to a mobile communications network. In the following reference is made to a MTC device. However, it should be understood that the invention is not limited to MTC devices.

When a MTC device belonging to a group of MTC devices attaches to a network, the MME shall download subscription information and any related group information from the HSS (Home Subscriber Server). If the MTC device belongs to a group, the HSS shall send the group's information including APN group AMBR information elements and current PDN gateway identity to the MME. If the current MTC device is the first member of the group that is attaching to the network, the returned PDN gateway shall be null or predefined by the HSS. If the returned PDN gateway information is null, the MME can freely select the PDN gateway as defined in existing 3GPP standards. Then the MME shall send the group information (APN group AMBR) along with other information to the PDN gateway. If the device is attached to the network successfully, the MME shall send the selected PDN gateway address to the HSS, which shall update the stored value with the received PDN gateway address. The MTC devices attaching later can then connect to the same PDN gateway.

In the PDN gateway non-GBR bearers of all PDN connections of the MTC devices belonging to the same group will share the maximum bit rate specified in the APN group AMBR. The PDN gateway shall enforce the APN group AMBR for both uplink and downlink traffic.

Before an attach procedure of one member of the group is discussed in connection with FIG. 1, a HSS 20 as shown in FIG. 2 is explained in more detail. The HSS 20 contains subscriber-related profiles 21 of different subscribers subscribing to a mobile communications network. If a subscriber is a member of a group of mobile entities for which the maximum bit rate for an aggregated maximum bit rate for the group should be controlled, the subscriber-related profile 21 additionally contains information indicating the group to which the mobile entity belongs, as indicated by row 21a of FIG. 2. The HSS additionally comprises a subscriber group related profile 24, each group related profile containing group related information. The group related profile 24 may contain the group ID that is used to identify the group uniquely, and/or the group name denoting the name of the group. The group profile contains as additional group related subscriber information, the APN name, such as a string to denote the name of the APN associated with the group. Normally, only one APN can be associated with the group. Furthermore, the maximum bit rate information is included as APN group AMBR containing the aggregated maximum bit rate for said group per APN. Additionally, the group-related profile 24 contains the identity of the current PDN gateway of the group. As discussed in more detail below, this can be either statically preconfigured or dynamically selected by the MME when the first member of the group connects to the network. Additionally, the group related profile may contain a connected member counter containing the number of members of the group that are still connected to the network. As discussed in more detail below, an update location message will be received from a MME using input/output unit 23, a controller 22 being provided that includes into a response message transmitted from the HSS the PDN gateway information allowing the receiving network node to identify the PDN gateway through which all members of the group should connect to the packet-switched network. This helps to enforce the APN group AMBR in the gateway easily when all mobile entities of one group connect to the same PDN gateway for a certain APN.

In the HSS for each mobile entity of the group an additional field group ID is added into a certain APN context of its subscription data. It is used to identify the group the mobile entity belongs to. The corresponding APN shall be the same as the configuration in the group table.

Referring back to FIG. 1, an attach procedure of a mobile entity named user equipment (UE) in the embodiment shown in FIG. 1 is explained in more detail. The standard attach procedure to the network is modified to support the common quality of service enforcement for the group of MTC entities. In the first step shown in FIG. 1 the UE initiates the attach procedure by sending an attach request message to the eNodeB, which is then forwarded to the MME. In the second step an authentication/security step is carried out in which the MME shall authenticate the mobile entity and set up security functions.

In the third step shown in the figure, the MME starts an update location request message to the HSS along with the necessary parameters. In step 4 the HSS shall retrieve and check the subscription data of the mobile entity. If the mobile entity belongs to a group, the HSS shall check the corresponding group configuration to get the APN group AMBR and the PDN gateway address of that group. The HSS sends back an update location acknowledgement message which contains the PDN subscription data of the mobile entity. Furthermore, the group ID, the APN group AMBR and the current PDN gateway address is included in the PDN subscription data.

In the fifth step a create session request message is sent from the MME to the serving gateway. Furthermore, the MME selects a PDN gateway based on the APN provided by the mobile entity. If no APN is given by the mobile entity, a default APN should be used. If the subscription context received in the update location acknowledgement message contains a valid PDN gateway identity, the MME shall select this PDN gateway for attaching the mobile entity. Otherwise, the MME may select a new PDN gateway as described in 3GPP TS 23.401. This is the case when the returned PDN gateway address is such that the MME is informed that it can freely select a PDN gateway, e.g. when no or empty PDN gateway information is sent. As discussed above, this can happen if the attaching mobile entity is the first mobile entity of the group that is attaching to the network. The MME then selects the serving gateway based on the received PDN gateway information and sends a create session request message to the selected serving gateway. This message contains the group-related parameters, such as the group ID, and the APN group AMBR information.

In the next step shown in the figure (step 6) the serving gateway sends a create session request message including the group-related parameters to the PDN gateway.

Upon reception of the create session request message the PDN gateway shall check the included group ID and the APN group AMBR information elements along with other information from the message in addition to the other defined actions. The PDN gateway shall create a group profile containing the group configuration information. For each attached group the PDN gateway creates an entry to contain the group ID, APN, APN group AMBR, and the bearer context of the mobile entities which belong to the group and have connected to this PDN gateway. When the PDN gateway receives a create session request containing group information, the PDN gateway shall look up the group ID in the group profile. If found, the PDN gateway adds the bearer context of the mobile entity to the corresponding entry. Otherwise, the PDN gateway creates a new entry in the group profile based on the received group information included in the create session request message. The PDN gateway then sends a create session response message to the serving gateway in which all necessary information, i.e. at least the group identity information, is included (step 7).

In step 8 the serving gateway returns a create session response message to the MME, the MME sending an attach accept message to the eNodeB which is then forwarded to the mobile entity (step 9).

In step 10 the mobile entity sends an attach complete message to the eNodeB which is then forwarded to the MME.

In step 11 the MME sends a modify bearer request message to notify the serving gateway of the established tunnel information between the eNodeB and the serving gateway. In step 12 the serving gateway acknowledges the received message by sending a modify bearer response (EPS bearer identity) message to the MME.

After the MME receives the modify bearer response (EPS bearer identity) message, the MME shall send a notify request message including the APN, group identity and PDN gateway identity to the HSS. In step 14 the HSS stores the PDN gateway identity in the corresponding item of the group table and sends a notify response to the MME.

Two attribute value pairs (AVPs) are defined to contain group related information: the group identity and the APN group AMBR AVPs. The group identity AVP is of type unsigned 32, and it shall contain the identity of the group. APN group AMBR AVP is type grouped and its AVP format may be as follows:

```
AMBR ::=<AVP header: xxxx>
        (Max-Requested-Bandwidth-UL)
        (Max-Requested-Bandwidth-DL)
        *[AVP]
```

If the group profile is not empty, the PDN gateway enforces the APN group AMBR for both the downlink and uplink traffic from and to the mobile entity in a generally known manner. The PDN gateway thus ensures that the usage of those non-GBR bearers for all users belonging to the same group does not exceed the specified APN group AMBR specified in the group profile. When the traffic of a group reaches its maximum bit rate APN group AMBR, it is the responsibility of the PDN gateway to decide which packets shall be dropped. One possibility to distribute the bandwidth between the different members of a group is that all members of the group share the bandwidth equally. However, it is also possible that the bandwidth is unequally distributed between the members of the group.

Figure 4:
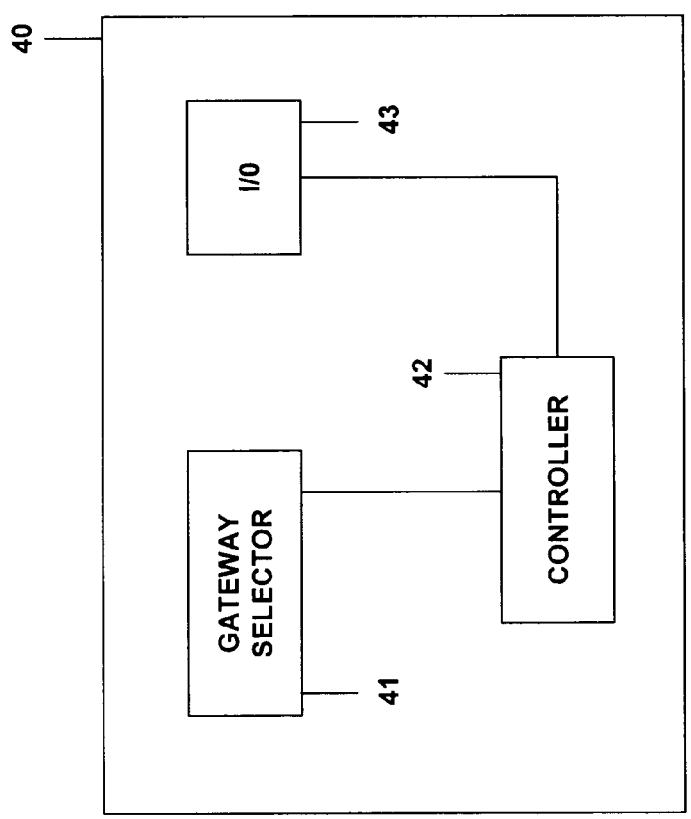
FIG. 4 shows a schematic view of a MME selecting a PDN gateway in accordance with a received PDN gateway information.

In FIG. 4 the MME selecting the PDN gateway based on the received PDN gateway information is shown in more detail. The MME 40 receives the response message from the HSS 20 including the PDN gateway information via receiver 43. A control unit 42 controlling the functioning of the MME forwards the received message to a gateway selector 41 which then selects the PDN gateway in dependence on the received PDN gateway information. The received PDN gateway information may be the PDN gateway when used by other members of the group, or if the attaching gateway is the first member of the group, the received gateway information may allow the gateway selector to freely select a new PDN gateway. As an alternative the HSS may determine the selected PDN gateway for the first member of the group and transmit this information to the MME where the selection of the gateway is carried out in the gateway selector 41.

Figure 3:
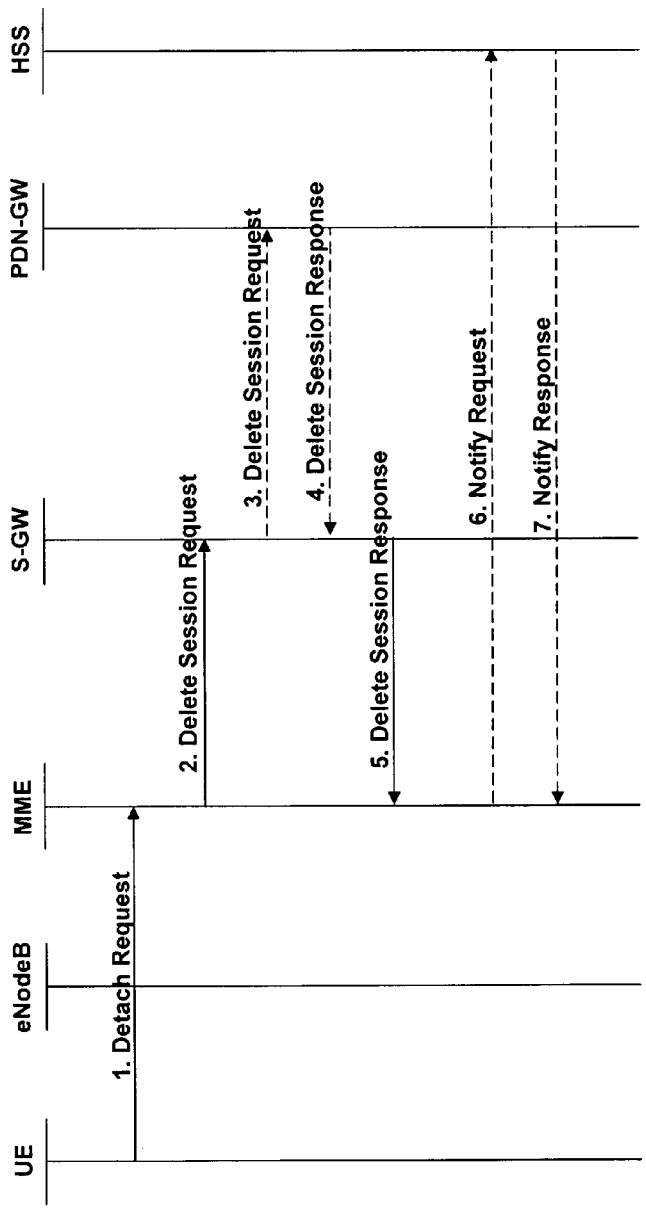
FIG. 3 shows a state diagram of a detach procedure for one of the mobile entities of said group.

In connection with FIG. 3 the detach procedure for a mobile entity of the group detaching from the packet-switched network is shown in more detail. The detach procedure can be initiated by the mobile entity or by the network. In step 1 shown in FIG. 3 the mobile entity sends a detach request message to the MME through the eNodeB. In the second step the MME sends a delete session request message to the serving gateway to deactivate the EPS bearers. In the third step shown the serving gateway sends a delete session request message to the PDN gateway.

The PDN gateway shall then release the EPS bearers of the mobile entity. The PDN gateway shall furthermore determine if the mobile entity belongs to a group by checking if its EPS bearer context contains group configuration. If the mobile entity belongs to a group, the PDN gateway shall remove its bearer context from that group's configuration in the group profile. If the mobile entity is the last connected device of the group, the entire item of said group is removed from the group profile. In step 4 the PDN gateway then acknowledges the serving gateway with a delete session response message. In the fifth step the serving gateway sends a delete session response message to the MME, the MME sending a notify request message including the group identity to the HSS (step 6).

After receiving the notify request message, the HSS decreases the counter of connected mobile entities of said group by one. If the counter becomes zero, the HSS shall set the PDN gateway identity of that group to null. If the PDN gateway is not statically configured, this information allows the MME in an attach procedure to freely select a PDN gateway when a first member of the group attaches to the network.

Figure 5:
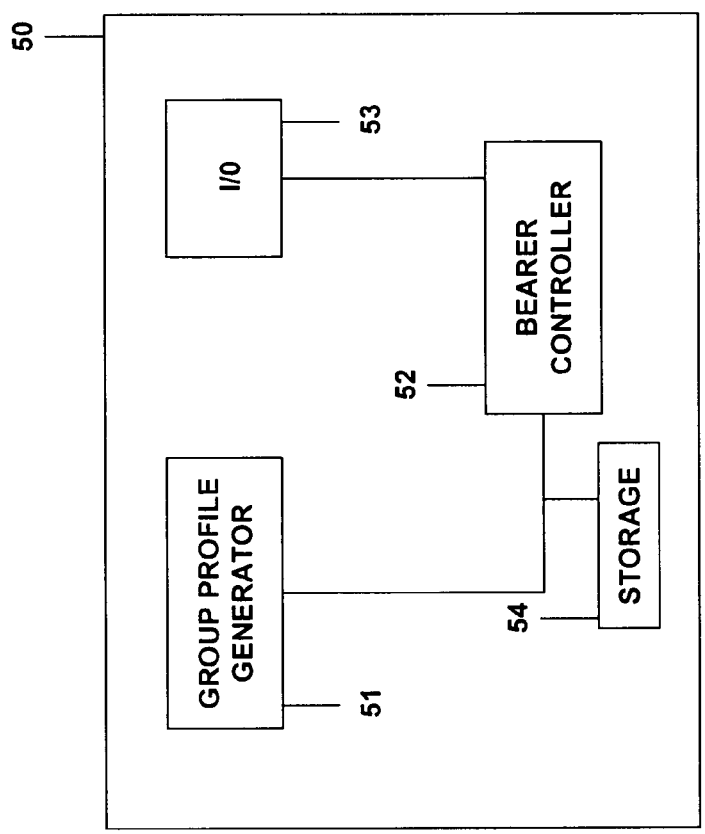
FIG. 5 shows a schematic view of a PDN gateway through which the mobile entities belonging to a group of mobile entities access the packet-switched network.

In FIG. 5 a more detailed view of the PDN gateway 50 is shown. The PDN gateway 50 comprises a group profile generator 51, where a group profile is created that contains the group configuration information, the group profile containing the group ID, the APN group AMBR, the bearer context of the mobile entities which belong to the group, etc. A storage unit 54 is provided storing the group profiles. When the PDN gateway receives the create session request message of step 6 of FIG. 1 via receiver 53, the message is transmitted via a bearer controller 52 to the group profile generator, where the group profile is generated, as discussed above.

The present invention helps to enforce the common quality of service parameters for all members belonging to the same group of mobile entities. For the PDN gateway it is easy to enforce the common quality of service parameters, as all mobile entities are connected to the same PDN gateway.

The invention claimed is:

1. A method for controlling an attach procedure of a mobile entity to a packet switched network, the mobile entity belonging to a group of mobile entities which are accessing the packet switched network using a specified access point, the method comprising:
   receiving an attach request message for a mobile entity of the group of mobile entities;
   transmitting an update location request message to a subscriber database where subscriber related profiles of the group of mobile entities are provided;
   receiving a response message from the subscriber database, the response message including:
      Packet Data Network (PDN) gateway information indicative of a PDN gateway associated with or to be associated with the group of mobile entities; and
      a maximum bit rate information for a bearer used for data transmission over the packet switched network using the specified access point;
   selecting a PDN gateway based on the PDN gateway information contained in the response message and initiating a bearer setup of a bearer meeting the maximum bit rate information contained in the response message.

2. The method of claim 1, wherein the initiating a bearer setup comprises selecting a serving gateway and transmitting a create session request message to the serving gateway for the PDN gateway, the create session request message including the PDN gateway information and the maximum bit rate information.

3. The method of claim 1:
   further comprising transmitting, in response to receipt of a modify bearer response message from a serving gateway, a notify request message to the subscriber database;
   wherein the notify request message includes the PDN gateway information, the maximum bit rate information, and a group identity information allowing identification the group to which the mobile entity belongs.

4. The method of claim 1, wherein the selecting the PDN gateway comprises selecting a new PDN gateway if both of:
   the mobile entity is a first of the group of mobile entities that is attaching to the packet switched network;
   the PDN gateway information included in the response message comprises no information suitable to identify a PDN gateway associated with or to be associated with the group of mobile entities, or comprises information allowing selection of a new PDN gateway.

5. The method of claim 4, further comprising sending selected PDN gateway information to the subscriber database after the new PDN gateway has been selected.

6. A method for operating a subscriber database in which subscriber related profiles of mobile entities subscribing to a cellular network are provided, the database further including a subscriber group related profile of a group of mobile entities which are accessing a packet switched network using a specified access point, the method comprising:

receiving, for a mobile entity of the group of mobile entities, an update location request message relating to an access to the packet switched network;

checking whether the mobile entity is part of the group of mobile entities;

retrieving from the subscriber group related profile, if it is determined that the mobile entity is part of the group of mobile entities, a maximum bit rate information for a bearer used for data transmission over the packet switched network for the group;

including the maximum bit rate information into an update acknowledgment message;

wherein, in response to the mobile entity not being a first of the group of mobile entities that is attaching to the packet switched network, the update acknowledgement message includes a Packet Data Network (PDN) gateway information predetermined by the subscriber database.

7. The method of claim 6:

wherein the retrieving further comprises, retrieving from the subscriber group related profile, if it is determined that the mobile entity is part of the group of mobile entities, Packet Data Network (PDN) gateway information indicative of a PDN gateway associated with or to be associated with the group of mobile entities;

wherein the including comprises including the retrieved PDN gateway information in the update acknowledgement message.

8. The method of claim 6 further comprising:

determining, in a detach procedure of one of the mobile entities belonging to the group, the number of mobile entities of the group attached to the packet switched network;

in response to the determining indicating that a last member of the group has detached, updating the PDN gateway information in the subscriber group related profile.

9. A method for operating a subscriber database in which subscriber related profiles of mobile entities subscribing to a cellular network are provided, the database further including a subscriber group related profile of a group of mobile entities which are accessing a packet switched network using a specified access point, the method comprising:

receiving, for a mobile entity of the group of mobile entities, an update location request message relating to an access to the packet switched network;

checking whether the mobile entity is part of the group of mobile entities;

retrieving from the subscriber group related profile, if it is determined that the mobile entity is part of the group of mobile entities, a maximum bit rate information for a bearer used for data transmission over the packet switched network for the group;

including the maximum bit rate information into an update acknowledgment message;

wherein, in response to the mobile entity not being a first of the group of mobile entities that is attaching to the packet switched network, the update acknowledgement message includes information allowing an entity receiving the update acknowledgement message to select a new PDN gateway.

10. The method of claim 9:

further comprising, thereafter and after selection of a PDN gateway by an entity, receiving a selected PDN gateway information;

updating PDN gateway information in the subscriber group related profile based on the selected PDN gateway information.

11. A method for operating a Packet Data Network (PDN) gateway through which a mobile entity belonging to a group of mobile entities which are accessing a packet switched network using a specified access point accesses the packet switched network, the method comprising:

determining, based on a received create session request message of a mobile entity, a group identity information allowing identification of the group of mobile entities to which the mobile entity belongs to;

creating a group profile containing group configuration information, the group configuration information including:

the group identity information;

access point information allowing identification of the access point used to access the packet switched network;

a maximum bit rate information for a bearer used for data transmission over the packet switched network for the group using the specified access point;

transmitting a create session response message, including at least the group identity information, to a control node controlling an attach procedure of the mobile entity to the packet switched network.

12. The method of claim 11, further comprising, if the received create session request message contains the group identification information:

retrieving the group identity information from a subscriber group related profile;

adding a bearer context of the mobile entity to the subscriber group related profile.

13. The method of claim 11, further comprising enforcing, based on the maximum bit rate information, an aggregated maximum bit rate for all non-guaranteed bit rate bearers used by the group of mobile entities accessing the packet switched network using the specified access point.

14. The method of claim 11, wherein the maximum bit rate information is an aggregate maximum bit rate information for the group of mobile entities for the specified access point.

15. The method of claim 11, wherein the mobile entity is a Machine Type Communication entity.

16. A Home Subscriber Server (HSS), comprising:

a controller;

an input/output unit;

a subscriber database containing subscriber related profiles of subscribers to a cellular network and at least one subscriber group related profile of a group of mobile entities;

wherein the at least one subscriber group related profile contains group related subscriber information including:

at least Packet Data Network (PDN) gateway information indicative of a PDN gateway associated with or to be associated with the group of mobile entities;

a maximum bit rate information for at least one bearer used for data transmission over a packet switched network for the group;

a group identity information allowing identification of the group to which the mobile entities belongs to;

wherein the controller is configured to include the maximum bit rate information in an update acknowledgment message generated by the HSS in response to receipt of a update location request message relating to an access to the packet switched network by a mobile entity of the group of mobile entities.

17. The HSS of claim 16, wherein the maximum bit rate information is the aggregated maximum bit rate for the group of mobile entities per access point for all non-guaranteed bit rate bearers across all connections of the mobile entities belonging to the group for the same access point.

18. The HSS of claim 16, wherein the at least one subscriber group related profile further contains at least one of the following information:
   a group name used to denote the group of mobile entities;
   an APN name denoting a name of the access point associated with the group;
   a number of connected members of the group connected to the packet switched network.

19. The subscriber database of claim 16, wherein the mobile entity is a Machine Type Communication entity.

20. A Packet Data Network (PDN) gateway through which a mobile entity accesses a packet switched network, the mobile entity belonging to a group of mobile entities which are accessing the packet switched network using a specified access point, the PDN gateway comprising:
   a receiver configured to receive a create session request message of the mobile entity;
   a storage unit configured to store one or more group profiles containing group configuration information, the group configuration information including:
      group identity information allowing for identification of the group of mobile entities;
      access point information allowing identification of the access point used to access the packet switched network;
      a maximum bit rate information for a bearer used for data transmission over the packet switched network for the group using the specified access point;
   a transmitter configured to transmit a create session response message, including at least the group identity information, to a control node controlling an attach procedure of a mobile entity to a packet switched network.

21. The PDN gateway of claim 20, wherein the maximum bit rate information is an aggregated maximum bit rate for the group of mobile devices per access point, for all non-guaranteed bit rate bearers across all connections of the mobile entities belonging to the group for the same access point.

* * * * *